(12) United States Patent
Matsuo et al.

(10) Patent No.: US 9,783,418 B2
(45) Date of Patent: Oct. 10, 2017

(54) PHOSPHORUS AND CALCIUM COLLECTION METHOD, AND MIXTURE PRODUCED BY SAID COLLECTION METHOD

(71) Applicant: NISSHIN STEEL CO., LTD., Tokyo (JP)

(72) Inventors: Shoichi Matsuo, Osaka (JP); Akihiro Asaba, Osaka (JP); Yasushi Fukui, Osaka (JP); Masaya Yamamoto, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/114,719

(22) PCT Filed: Nov. 11, 2014

(86) PCT No.: PCT/JP2014/005662
§ 371 (c)(1),
(2) Date: Jul. 27, 2016

(87) PCT Pub. No.: WO2015/114703
PCT Pub. Date: Aug. 6, 2015

(65) Prior Publication Data
US 2016/0347615 A1 Dec. 1, 2016

(30) Foreign Application Priority Data

Jan. 28, 2014 (JP) .................. 2014-013536

(51) Int. Cl.
*C01B 25/00* (2006.01)
*C01B 25/01* (2006.01)
(Continued)

(52) U.S. Cl.
CPC .............. *C01B 25/01* (2013.01); *C01B 25/32* (2013.01); *C04B 5/00* (2013.01); *C04B 5/06* (2013.01);
(Continued)

(58) Field of Classification Search
CPC ........... C01B 25/01; C01B 33/24; C04B 5/00; C01F 1/00; C01F 11/00; C01F 11/02; C01F 11/181
(Continued)

(56) References Cited

U.S. PATENT DOCUMENTS

| 5,236,495 A * | 8/1993 | Manabe ............... C03B 9/48 |
| | | 106/35 |
| 2012/0070360 A1* | 3/2012 | Wissemborski ... B01D 11/0203 |
| | | 423/304 |
| 2013/0209377 A1* | 8/2013 | Tas ...................... A61L 27/12 |
| | | 424/52 |

FOREIGN PATENT DOCUMENTS

| JP | 55-100220 A | 7/1980 |
| JP | 2008-000664 A | 1/2008 |

(Continued)

OTHER PUBLICATIONS

International Search Report from International Application No. PCT/JP2014/005662 mailed Feb. 3, 2015.
(Continued)

*Primary Examiner* — Steven Bos
(74) *Attorney, Agent, or Firm* — Brundidge & Stanger, P.C.

(57) ABSTRACT

An aqueous solution containing 30 ppm or more of carbon dioxide is brought into contact with a steel-making slag to elute phosphorus and calcium contained in the steel-making slag into the aqueous solution. Subsequently, carbon dioxide is removed from the aqueous solution to precipitate a mixture comprising a phosphorus compound and a calcium compound. In this manner, a mixture comprising a phosphorus compound and a calcium compound and containing phosphorus in an amount of 1% by mass or more in terms of phosphorus atom content can be produced.

6 Claims, 3 Drawing Sheets

(51) Int. Cl.
*C04B 5/00* (2006.01)
*C01B 25/32* (2006.01)
*C04B 5/06* (2006.01)

(52) U.S. Cl.
CPC ...... *C21B 2200/00* (2013.01); *C21C 2200/00* (2013.01)

(58) Field of Classification Search
USPC .............................. 423/157.5, 158–160, 304
See application file for complete search history.

(56) References Cited

FOREIGN PATENT DOCUMENTS

| | | |
|---|---|---|
| JP | 2010-120782 A | 6/2010 |
| JP | 2010-270378 A | 12/2010 |
| JP | 2013-142046 A | 7/2013 |
| JP | 2013-147370 A | 8/2013 |

OTHER PUBLICATIONS

Aeration—Wikipedia <https://en.wikipedia.org/wiki/Aeration> accessed online Feb. 13, 2017.

\* cited by examiner

PHOSPHORUS AND CALCIUM COLLECTION METHOD, AND MIXTURE PRODUCED BY SAID COLLECTION METHOD

TECHNICAL FIELD

The present invention relates to a method of recovering phosphorus and calcium from steelmaking slag, and a mixture obtained by the recovery method.

BACKGROUND ART

It has been known that steelmaking slag produced in steelmaking process (e.g., converter slag, pretreatment slag, secondary refining slag and electric furnace slag) contains oxides of phosphorus, calcium, iron, silicon, manganese, aluminum, and magnesium, for example. Specifically, steelmaking slag contains phosphorus with calcium silicates such as $Ca_2SiO_4$ and $Ca_3SiO_5$, and calcium iron oxides such as $Ca_2Fe_2O_5$. Steelmaking slag contains calcium, from quicklime (CaO) loaded during steelmaking process, as undissolved CaO (free lime), or as $Ca(OH)_2$ or $CaCO_3$ generated from free lime reacting with moisture or carbon dioxide in the air.

Phosphorus is an important element as the material for fertilizers or chemical products. Mineral phosphorus (phosphorus) is not produced in Japan, and imported in the form of mineral phosphorus, fertilizers, chemical products, for example. High-quality mineral phosphorus is low in quantity, which may cause strain on phosphorus resources; therefore, the phosphorus price is now on the rise (see, e.g., NPLs 1 and 2). In view of such a situation, when phosphorus can be recovered from the steelmaking slag, the strain on phosphorus resources would be alleviated. Thus, attempts to recover phosphorus from steelmaking slag have been made (see, e.g., PTLS 1 and 2).

PTL 1 discloses a method of recovering phosphorus from steelmaking slag with calcium removed. In the recovery method, calcium is removed from steelmaking slag by washing the steelmaking slag with water containing carbon dioxide. Next, phosphorus in the steelmaking slag is eluted into a mineral acid by dipping the steelmaking slag in the mineral acid. Lastly, phosphorus (phosphoric acid) is recovered by neutralizing the mineral acid containing eluted phosphorus (extract).

PTL 2 discloses a method in which a calcium compound from steelmaking slag for more than one times, and phosphorus in a state of solid solution in a specific calcium compound is recovered. In the recovery method, the steelmaking slag (pretreatment slag) is dipped in water containing dissolved carbon dioxide. Subsequently, a calcium compound having no phosphorus in a state of solid solution is eluted, and then, a calcium compound having phosphorus in a state of solid solution is eluted, whereby solution containing phosphorus is recovered from dephosphorization slag.

Calcium is also an important element which is used in a sintering process for iron-making in the form of calcium carbonate, or used in a steelmaking process in the form of calcium oxide after calcined. Calcium hydroxide obtained by slaking calcium oxide with water is used as a neutralizer for acids and the like in a draining process. Therefore, when calcium can be recovered from steelmaking slag obtained in iron-making process, calcium can be reused to reduce iron-making costs. Thus, attempts to recover calcium from steelmaking slag have been made (see PTL 3).

PTL 3 discloses a method of recovering calcium from converter slag using carbon dioxide. The recovery method elutes calcium from the converter slag by injecting water into the converter slag. Then, calcium (calcium carbonate) is recovered from the converter slag by keeping the lower limit of pH at about 10.

CITATION LIST

Patent Literature

PTL 1
Japanese Patent Application Laid-Open No. 2010-270378
PTL 2
Japanese Patent Application Laid-Open No. 2013-142046
PTL 3
Japanese Patent Application Laid-Open No. 55-100220

Non-Patent Literature

NPL 1
"Mineral Resources Material Flow 2011" Japan Oil, Gas and Metals National Corporation, May 2012, P405-410
NPL 2
Kazuyo Matsubae et al., "Recovery of Artificial Phosphorus Resource from Wastes" Collection of Sociotechnology Research Papers, Sociotechnology Research Network, March 2008, p106-113

SUMMARY OF INVENTION

Technical Problem

The method of recovering phosphorus disclosed in PTL 1 uses a mineral acid and neutralizer thereby disadvantageously increasing recovery costs. A filtering apparatus (filter) is also needed to filter undissolved materials at the time of dipping steelmaking slag in the mineral acid, thereby increasing recovery costs. Furthermore, other components such as iron, manganese, magnesium, silicon, aluminum and calcium are also dissolved in the mineral acid, and those components are precipitated even when the extract is neutralized.

The method of recovering phosphorus disclosed in PTL 2 needs to dissolve a calcium compound for more than one times, which complicates recovery process, and increases recovery costs.

In the method of recovering phosphorus disclosed in PTL 3, keeping pH at 10 or more is difficult in practical use, and when pH becomes lower, precipitated calcium carbonate is dissolved again. When the lower limit of pH is kept at about 10, the precipitation amount becomes low. Furthermore, dissolving calcium silicates containing phosphorus is difficult in the recovery method, and little phosphorus can be recovered, thereby increasing recovery costs.

As described above, the conventional methods for recovering phosphorus or calcium suffer from high recovery costs.

An object of the present invention is to provide a method of recovering phosphorus and calcium, which can recover phosphorus and calcium from steelmaking slag at low cost. Another object of the present invention is to provide a mixture containing phosphorus and calcium obtained by the recovery method.

Solution to Problem

The present inventors have found that the objects can be achieved by bringing steelmaking slag in contact with aqueous solution containing carbon dioxide, and precipitating eluted substances by removing carbon dioxide from the aqueous solution, and completed the present invention with further studies.

The present invention relates to a recovery method as follows.

[1] A method of recovering phosphorus and calcium from steelmaking slag, comprising: bringing the steelmaking slag in contact with aqueous solution containing 30 ppm or more of carbon dioxide to elute phosphorus and calcium contained in the steelmaking slag into the aqueous solution; and subsequently, removing the carbon dioxide from the aqueous solution to precipitate a mixture containing a phosphorus compound and a calcium compound.

[2] The method of recovering phosphorus and calcium according to [1], wherein the removing of the carbon dioxide includes: partly removing the carbon dioxide from the aqueous solution to precipitate the mixture; and subsequently, further removing the carbon dioxide from the aqueous solution to precipitate the mixture, and a proportion of the phosphorus compound in the mixture obtained in the further removing of the carbon dioxide is less than a proportion of the phosphorus compound in the mixture obtained in the partly removing of the carbon dioxide.

[3] The method of recovering phosphorus and calcium according to [2], wherein a precipitation rate of the mixture in the partly removing of the carbon dioxide is 0.1 g/min·L or less.

[4] The method of recovering phosphorus and calcium according to any one of [1] to [3], wherein, in the removing of the carbon dioxide, the carbon dioxide is removed by blowing one or more gases selected from the group consisting of air, nitrogen, oxygen, hydrogen, argon and helium into the aqueous solution.

[5] The method of recovering phosphorus and calcium according to [4], wherein, in the partly removing of the carbon dioxide, the one or more gases are intermittently blown into the aqueous solution.

[6] The method of recovering phosphorus and calcium according to any one of [1] to [3], wherein, in the removing of the carbon dioxide, the carbon dioxide is removed by reducing a pressure of the aqueous solution.

[7] The method of recovering phosphorus and calcium according to any one of [1] to [3], wherein, in the removing of the carbon dioxide, the carbon dioxide is removed by heating the aqueous solution.

The present invention also relates to a mixture obtained by the above methods.

[8] The mixture obtained by the method of recovering phosphorus and calcium according to any one of [1] to [7], wherein the mixture contains a phosphorus compound and a calcium compound, and the mixture contains 1 wt % or more of phosphorus in terms of atom Advantageous Effects of Invention According to the present invention, phosphorus and calcium can be recovered from steelmaking slag at low cost.

DESCRIPTION OF EMBODIMENTS

Recovery Method

Figure 1:
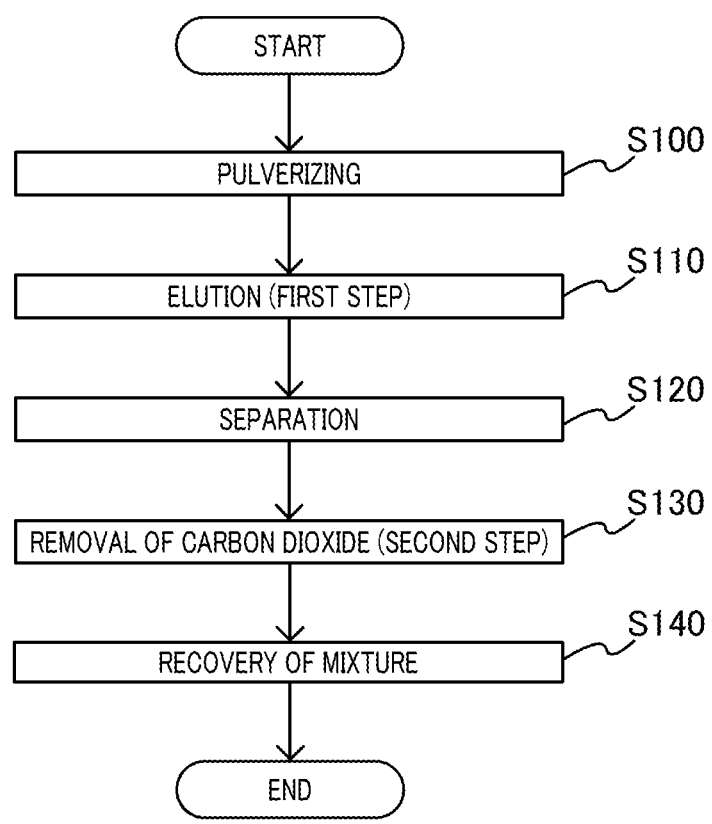
FIG. 1 is a flowchart of a method of recovering phosphorus and calcium according to an embodiment of the present invention.

FIG. 1 is a flowchart of a method of recovering phosphorus and calcium according to an embodiment of the present invention. As illustrated in FIG. 1, the method of recovering phosphorus and calcium according to the embodiment includes a first step in which phosphorus and calcium in steelmaking slag are eluted into an aqueous solution containing carbon dioxide, and a second step which is to be performed after the first step and in which a mixture containing a phosphorus compound and a calcium compound is precipitated.

(First Step)

In the first step, steelmaking slag is brought in contact with aqueous solution containing carbon dioxide to elute phosphorus and calcium contained in the steelmaking slag into the aqueous solution.

Steelmaking slag as the material is prepared, and then fractured or pulverized (Step S100). The types of steelmaking slag are not particularly limited as long as the steelmaking slag contains phosphorus and calcium. Examples of steelmaking slag include converter slag, pretreatment slag, secondary refining slag and electric furnace slag. Typically, steelmaking slag contains, for example, compounds (oxides) of phosphorus (P), calcium (Ca), iron (Fe), silicon (Si), manganese (Mn), magnesium (Mg), and aluminum (Al). Phosphorus is contained with calcium silicates, which are composite oxides of calcium and silicon, such as $Ca_2SiO_4$ and $Ca_3SiO_5$. Calcium is contained as calcium oxide (CaO), which is free lime, calcium hydroxide $(Ca(OH)_2)$ or calcium carbonate $(CaCO_3)$.

Steelmaking slag may be used as discharged in a steelmaking process, but it is preferable that steelmaking slag is used, which is fractured or pulverized and then from which metal iron is removed. When steelmaking slag discharged in a steelmaking process is used without any treatment, a recovery operation may become complicated. The maximum particle diameter of the steelmaking slag is preferably, although not limited to, 1000 μm or less. When the maximum particle diameter of the steelmaking slag is more than 1000 μm, the contact area between the steelmaking slag and the aqueous solution is small that the time for eluting phosphorus and calcium becomes longer, which lengthens the time for recovery of phosphorus and calcium. An example of a method of pulverizing the steelmaking slag is, although not limited to, to pulverize the steelmaking slag with, e.g., a roller mill or ball mill.

Next, phosphorus and calcium in the steelmaking slag prepared in step S100 is eluted into the aqueous solution containing carbon dioxide by bringing the steelmaking slag in contact with the aqueous solution containing carbon dioxide (Step S110).

The types of aqueous solution containing carbon dioxide are not particularly limited as long as the aqueous solution contains 30 ppm or more of carbon dioxide, and may contain other components. Any method may be used for dissolving carbon dioxide into water. For example, carbon dioxide can be dissolved in water by allowing gas containing carbon dioxide to bubble (blowing). The gas to be blown may contain components other than carbon dioxide. The gas to be blown may contain oxygen or nitrogen, for example. A discharged gas after combustion, or mixed gas of carbon dioxide, air and moisture may be blown to allow carbon dioxide to dissolve. The gas to be blown preferably contains carbon dioxide in high concentration (e.g. 90%) to accelerate reactions and increase elution of a calcium compound (calcium silicate). As described above, the concentration of carbon dioxide in the aqueous solution is 30 ppm or more. When the concentration of carbon dioxide in the aqueous solution is 30 ppm or more, phosphorus and calcium in the steelmaking slag can be eluted in the aqueous solution containing carbon dioxide. Since carbon dioxide in the aqueous solution decreases as phosphorus and calcium dissolve, carbon dioxide needed to be provided further into the aqueous solution after the steelmaking slag is brought in contact with the aqueous solution to keep the concentration of carbon dioxide (30 ppm or more) which is necessary for elution of phosphorus and calcium into the aqueous solution.

Any method may be used for bringing the steelmaking slag in contact with the aqueous solution containing carbon dioxide. For example, the steelmaking slag may be dipped in water in which carbon dioxide is previously dissolved, or the steelmaking slag may be dipped in water and then carbon dioxide is dissolved in the water. While the steelmaking slag is in contact with the aqueous solution, it is preferable that the steelmaking slag and the aqueous solution are stirred to accelerate reactions. The steelmaking slag from which phosphorus and calcium have been eluted contains a higher iron component content, thus the steelmaking slag can be used as iron-making materials without any treatment or after subjected to a treatment such as magnetic separation.

When the steelmaking slag is brought in contact with the aqueous solution containing carbon dioxide, calcium oxide (CaO), calcium hydroxide ($Ca(OH)_2$), calcium carbonate ($CaCO_3$), calcium silicates ($Ca_2SiO_4$ and $Ca_3SiO_5$), and calcium iron oxides (e.g., $Ca_2Fe_2O_5$) in the steelmaking slag react with water containing carbon dioxide whereby a calcium component is eluted into the aqueous solution. When calcium silicates are dissolved, diphosphorus pentaoxide ($P_2O_5$) in the steelmaking slag reacts with the aqueous solution containing carbon dioxide whereby a phosphorus component is eluted into water. Phosphorus and calcium contained in the steelmaking slag are thus eluted into the aqueous solution containing carbon dioxide by bringing the steelmaking slag in contact with the aqueous solution.

Subsequently, the aqueous solution containing dissolved phosphorus and calcium (supernatant) and the steelmaking slag are separated by, e.g., filtration (Step S120).

(Second Step)

In the second step subsequent to the first step, a mixture containing the phosphorus compound and calcium compound is precipitated from the aqueous solution containing dissolved phosphorus and calcium, and the mixture is recovered.

The mixture containing the phosphorus compound and calcium compound is precipitated by removing carbon dioxide from the aqueous solution containing dissolved phosphorus and calcium. Any method may be used for removing carbon dioxide from the aqueous solution. Examples of the methods for removing carbon dioxide include (1) blowing gas into the aqueous solution, (2) reducing the pressure of the aqueous solution, and (3) heating the aqueous solution. The methods will be described individually.

(1) Blowing Gas into Aqueous Solution

In the method of removing carbon dioxide by blowing gas into the aqueous solution, gas other than carbon dioxide is blown into the aqueous solution. This easily removes carbon dioxide from the aqueous solution by replacing dissolved carbon dioxide with the blown gas. The type of gas to be blown into water is preferably an inorganic gas having low reactivity with water, or an organic gas having low reactivity with water. Examples of inorganic gases include air, nitrogen, oxygen, hydrogen, argon and helium. Examples of the organic gases include methane, ethane, ethylene, acetylene and propane. Organic gases need to be handled carefully since they may combust or explode when leaked outside. When gases reactive with water such as chlorine gas and sulfur dioxide gas were used, ions such as chlorine ion and sulfate ion are generated in water. Those ions form salts with calcium eluted in water, which is not preferable because no mixture containing a phosphorus compound and a calcium compound precipitates when carbon dioxide is removed from the aqueous solution.

(2) Reducing Pressure of Aqueous Solution

In the method of removing carbon dioxide by reducing the pressure of the aqueous solution, the aqueous solution is put into an airtight container and air in the container is evacuated using, e.g., a pump to allow the container to have a reduced-pressure atmosphere (degassing). In addition to reducing the pressure of the aqueous solution, ultrasonic waves may be applied to the aqueous solution, or the aqueous solution may be stirred. Furthermore, in addition to reducing the pressure of the aqueous solution, ultrasonic waves and stirring may be applied to the aqueous solution. This can effectively remove carbon dioxide from the aqueous solution.

(3) Heating Aqueous Solution

In the method of removing carbon dioxide by heating the aqueous solution, the temperature of the aqueous solution is elevated. To lower heating costs, the temperature is preferably elevated to a temperature within a range so that the vapor pressure of water does not exceed the pressure in the atmosphere. For example, when the pressure in the atmosphere is the atmospheric pressure (1 atm), the heating temperature is less than 100° C.

When the aqueous solution is heated, not only carbon dioxide is removed but also a calcium compound is easily precipitated because the calcium compound (calcium carbonate) becomes less soluble.

The above three methods (1) to (3) may be combined to remove carbon dioxide. This can effectively remove carbon dioxide from the aqueous solution. The most suitable combination can be selected in view of, for example, a delivery system of gas or heat, a site location, and/or availability of by-product gas in a factory.

For example, while gas is blown into the aqueous solution, air is evacuated more than the blowing gas amount to allow the pressure to be a reduced-pressure atmosphere. In such a combination, provided are effects of blowing gas which removes carbon dioxide and provides stirring, and of reducing the pressure of the aqueous solution which removes carbon dioxide. Thus, carbon dioxide can be effectively removed. Additionally, heating can further accelerate removal of carbon dioxide. Carbon dioxide can be easily removed by effects of blowing gas into the aqueous solution and reducing the pressure of the aqueous solution, and therefore, the heating temperature does not need to be high, which can reduce heating costs.

When carbon dioxide is removed from the aqueous solution, calcium in the aqueous solution precipitates as a calcium compound. Examples of the precipitated calcium compounds include calcium carbonate, calcium hydrogen carbonate and calcium hydroxide. Phosphorus in the aqueous solution is also precipitated as a phosphorus compound by removing carbon dioxide from the aqueous solution. Examples of the precipitated phosphorus compounds include calcium phosphate, calcium hydrogen phosphate and hydroxyapatite (HAp).

Subsequently, the mixture containing a phosphorus compound and a calcium compound, which is precipitated in step S130, is recovered (Step S140).

By the above steps, phosphorus and calcium can be recovered from steelmaking slag at low cost.

As described above, the phosphorus compound recovered from steelmaking slag is important as phosphorus resources. Therefore, it is preferable that the phosphorus compound content in the mixture is large. The calcium compound recovered from the steelmaking slag can be reused as iron-making materials. It is not preferable when the iron-making materials contain a phosphorus compound. Therefore it is preferable to separately obtain a mixture containing a large content of phosphorus compound, and a mixture containing a small content of phosphorus compound from the aqueous solution containing phosphorus and calcium. To separately obtain two mixtures having different contents of each compound, it is preferable to carry out the second step as follows.

Figure 2:
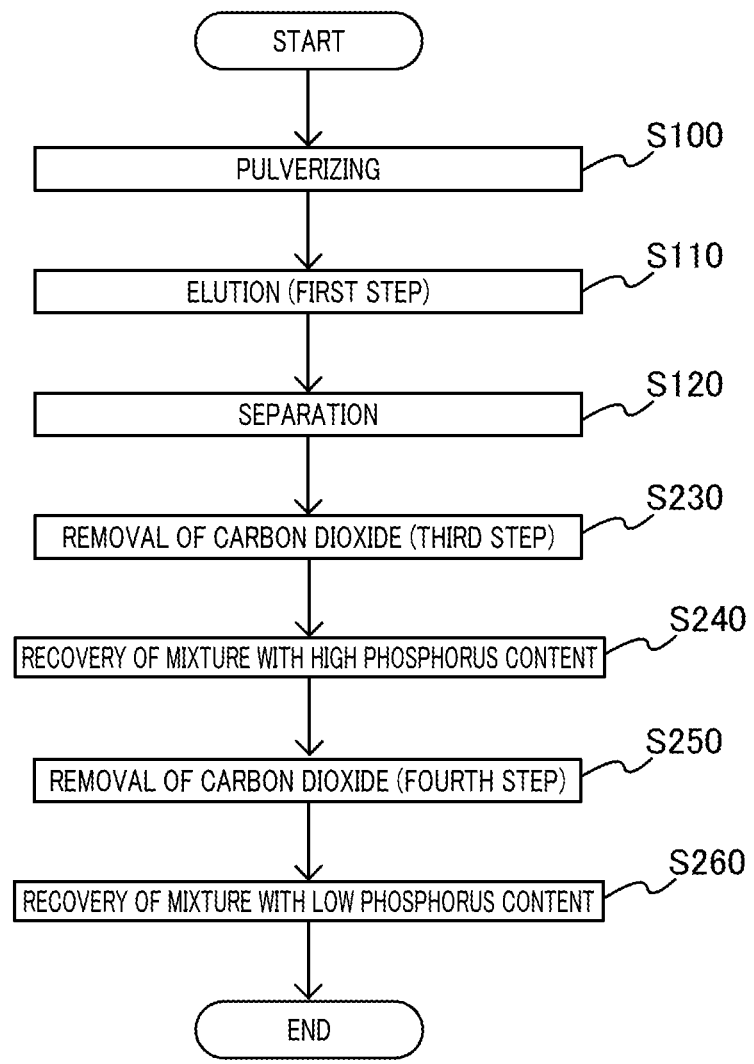
FIG. 2 is a flowchart of a method of recovering phosphorus and calcium according to another embodiment of the present invention.

FIG. 2 is a flowchart of a method of recovering phosphorus and calcium according to another embodiment of the present invention. As illustrates in FIG. 2, the second step in the present embodiment includes a third step in which part of carbon dioxide is removed from aqueous solution to precipitate a mixture, and a fourth step which is to be performed after the third step and in which carbon dioxide is further removed from the aqueous solution to precipitate a mixture. The proportion of a phosphorus compound contained in the mixture obtained in the fourth step is less than that of the mixture obtained in the third step.

The same as described above are the fracturing or pulverizing steelmaking slag (Step S100), the elution of phosphorus and calcium from the steelmaking slag (Step 110), separating aqueous solution containing dissolved phosphorus and calcium (supernatant) from the steelmaking slag from which phosphorus and calcium are eluted (Step S120).

(Third Step)

In the third step, a mixture with a high phosphorus compound content is precipitated by removing part of carbon dioxide from aqueous solution containing dissolved phosphorus and calcium (Step S230). The third step utilizes the nature of calcium compounds and phosphorus being easily precipitated together. The precipitation rate of the mixture in the third step is preferably 0.1 g/min·L or less. When the precipitation rate is 0.1 g/min·L or less, a phosphorus compound adsorbs on the surface of the calcium compound, which allows a large amount of the phosphorus compound to precipitate with the calcium compound. Stirring the aqueous solution accelerates precipitation of the phosphorus compound and calcium compound together. Subsequently, the mixture with a high phosphorus compound content is recovered (Step S240).

(Fourth Step)

In the fourth step subsequent to the third step, a mixture is precipitated by further removing carbon dioxide from the aqueous solution containing dissolved phosphorus and calcium (Step S250). Specifically, after the third step, the rest of the calcium compound is precipitated by further removing carbon dioxide from the aqueous solution. Since most of the phosphorus compound is precipitated in the third step, a mixture with a low phosphorus compound content can be obtained. The method of removing carbon dioxide may be any one of the above described blowing gas into the aqueous solution, reducing the pressure of the aqueous solution, and heating the aqueous solution. Any one of the methods can obtain a calcium compound containing little phosphorus compound. Subsequently, the mixture with a low phosphorus compound content is recovered (Step S260).

The above steps can separately obtain the mixture with a high phosphorus compound content and the mixture with a low phosphorus compound content.

In the third step, intermittingly removing carbon dioxide can also obtain a mixture with a high phosphorus content. Specifically, removing carbon dioxide and suspending the removal of carbon dioxide, within a short time, are repeated. In the present embodiment, carbon dioxide is preferably removed by blowing gas into the aqueous solution or reducing the pressure of the aqueous solution from the view point of operationality. For example, blowing gas into the aqueous solution for 0.5 minutes and suspending the gas blowing into the aqueous solution for one minute are repeated for three times. This allows phosphorus to adsorb on the surface of a precipitated calcium compound, then a calcium compound to newly precipitate on the surface of phosphorus or in the solution, and then a phosphorus compound to newly adsorb on the surface, which enables a large amount of phosphorus compound to adsorb per unit volume. In the third step, the stirring is preferably continued for some time after the blowing of gas into the aqueous solution or reducing the pressure of the aqueous solution is stopped. This enables an unadsorbed phosphate compound to adsorb to the precipitated calcium compound. The blowing of gas into the aqueous solution or reducing the pressure of the aqueous solution may be stopped at any time in the third step. When carbon dioxide is removed under specific conditions, the time of the third step is preferably 1/50 to 1/3 of the total removal time of carbon dioxide.

[Precipitate]

Thus obtained mixture (mixture according to the present invention) contains a phosphorus compound and a calcium compound, and the mixture contains 1 wt % or more of phosphorus in terms of atom. As described above, the examples of the phosphorus compounds include calcium phosphate, calcium hydrogen phosphate and hydroxyapatite (HAp). The examples of the calcium compounds include calcium carbonate, calcium hydrogen carbonate and calcium hydroxide. The phosphorus content in the mixture can be measured by ICP-AES method.

The method of recovering phosphorus and calcium can recover phosphorus and calcium from steelmaking slag as a mixture of a phosphorus compound and a calcium compound at low cost by bringing aqueous solution containing 30 ppm or more of carbon dioxide into contact with the steelmaking slag, eluting phosphorus and calcium in the steelmaking slag in the aqueous solution, and removing carbon dioxide from the aqueous solution.

Hereinafter, the present invention will be described in detail with reference to Examples, however, the present invention is not limited to Examples.

EXAMPLES

Experiment 1

Experiment 1 shows examples in which each of removal of carbon dioxide and recovery of a mixture was carried out once.

1. Preparation of Slag

Two types of steelmaking slag each having a different component ratio (slag A and slag B) were prepared (see Table 1). Slag A and slag B were pulverized using a roller mill to have the maximum particle diameter of 100 μm. The maximum particle diameter of the pulverized slag was measured using a laser diffraction/scattering type particle size distribution measuring device.

TABLE 1

| | Component Ratio (wt %) | | | | | | |
|---|---|---|---|---|---|---|---|
| | Fe | Ca | Si | Mn | Mg | Al | P |
| Slag A | 14.0 | 35.1 | 7.1 | 3.7 | 1.6 | 2.3 | 0.8 |
| Slag B | 14.6 | 34.2 | 6.7 | 4.9 | 2.0 | 0.9 | 2.1 |

2. Elution of Phosphorus and Calcium

The pulverized slag (1 kg, 3 kg, or 5 kg) was loaded in 100 L of water filling each container to provide a slag suspension. Then the provided slag suspension was stirred using an impeller for 30 minutes while carbon dioxide is blown into the slag suspension at the rate of 20 L/min. The carbon dioxide concentration at this time was 30 ppm or more. For the comparison, a slag suspension was stirred by an impeller for 30 minutes without blowing carbon dioxide into the slag suspension. Each slag suspension after stirring was allowed to stand to settle out slag. Then the supernatant was recovered and filtered by filtration under reduced pressure using a filter to remove floating substances.

3. Removal of Carbon Dioxide

Carbon dioxide contained in the supernatant was removed by one of the following methods: (1) blowing gas into the aqueous solution, (2) reducing the pressure of the aqueous solution, (3) heating the aqueous solution, (4) blowing gas into the aqueous solution and heating the aqueous solution, and (5) blowing gas into the aqueous solution, reducing the pressure of the aqueous solution and heating the aqueous solution. A precipitate was generated in the supernatant by the method. The methods for removing carbon dioxide (the above (1) to (5)) will be described.

(1) Blowing Gas into Aqueous Solution

The supernatant loaded in a container was stirred using an impeller for 30 minutes while gas (air, $N_2$, $O_2$, $H_2$, Ar, He or a combination thereof) is blown into the supernatant at the rate of 20 L/min to remove carbon dioxide. In Example 11 using $N_2$ and Ar as the gas, the rate of $N_2$ was 10 L/min, and the rate of Ar was 10 L/min.

(2) Reducing Pressure of Aqueous Solution

For 30 minutes, ultrasonic waves were applied to the supernatant loaded in an airtight container while the inside pressure of the airtight container was kept at $\frac{1}{10}$ atm to remove carbon dioxide.

(3) Heating Aqueous Solution

The supernatant loaded in a container was stirred using an impeller for 30 minutes while the liquid temperature of the supernatant is elevated to 90° C. to remove carbon dioxide.

(4) Blowing Gas into Aqueous Solution and Heating Aqueous Solution

The supernatant loaded in a container was stirred using an impeller for 30 minutes while air is blown into the supernatant at the rate of 20 L/min, and the liquid temperature of the supernatant is elevated to 90° C. to remove carbon dioxide.

(5) Blowing Gas into Aqueous Solution, Reducing Pressure of Aqueous Solution and Heating Aqueous Solution A state was kept for 30 minutes to remove carbon dioxide, in which air is blown into the supernatant loaded in an airtight container at the rate of 5 L/min while the inside pressure of the airtight container was kept at $\frac{3}{10}$ atm, and the liquid temperature of the supernatant was elevated to 60° C.

4. Recovery of Mixture and Measurement of Phosphorus Concentration in Mixture

Each supernatant containing a precipitate (mixture) was filtered under reduced pressure using a filter to recover the mixture. The supernatant, heated when removing carbon dioxide, was filtered under reduced pressure to recover the mixture while heating the supernatant so as not to lower the liquid temperature. The phosphorus concentration in the recovered mixture was measured by ICP-AES method. The ICP-AES method confirmed that the mixture also contains calcium. It was thus confirmed that a mixture containing a phosphorus compound and a calcium compound was obtained.

5. Results

Recovery conditions and recovery results of Experiment 1 are shown in Table 2.

TABLE 2

| | Slag | Eluting Method | Slag Amount (kg/100 L) | Removal Method of Carbon Dioxide | | | | | | | | Precipitate | |
|---|---|---|---|---|---|---|---|---|---|---|---|---|---|
| | | | | Blowing Gas (Type of Gas) | | | | | | Reducing Pressure | Heating | Mass (g/L) | Phosphorus Concentration (mass %) |
| | | | | Air | $N_2$ | $O_2$ | $H_2$ | Ar | He | | | | |
| Ex. 1 | A | Water Containing Dissolved Carbon Dioxide | 1 | Yes | No | No | No | No | No | No | No | 0.71 | 0.30 |
| Ex. 2 | | | 3 | Yes | No | No | No | No | No | No | No | 1.79 | 0.43 |
| Ex. 3 | | | 5 | Yes | No | No | No | No | No | No | No | 2.25 | 0.35 |
| Ex. 4 | | | 1 | No | Yes | No | No | No | No | No | No | 0.66 | 0.41 |
| Ex. 5 | | | 3 | No | Yes | No | No | No | No | No | No | 1.38 | 0.39 |
| Ex. 6 | | | 5 | No | Yes | No | No | No | No | No | No | 1.99 | 0.45 |
| Ex. 7 | | | 1 | No | No | Yes | No | No | No | No | No | 0.89 | 0.29 |
| Ex. 8 | | | 1 | No | No | No | Yes | No | No | No | No | 0.70 | 0.38 |
| Ex. 9 | | | 1 | No | No | No | No | Yes | No | No | No | 0.88 | 0.29 |
| Ex. 10 | | | 1 | No | No | No | No | No | Yes | No | No | 0.75 | 0.36 |
| Ex. 11 | | | 1 | No | Yes | No | No | Yes | No | No | No | 0.73 | 0.38 |
| Ex. 12 | | | 1 | No | No | No | No | No | No | Yes | No | 0.29 | 0.69 |
| Ex. 13 | | | 1 | No | No | No | No | No | No | No | Yes | 1.59 | 0.22 |
| Ex. 14 | | | 1 | Yes | No | No | No | No | No | No | Yes | 1.70 | 0.19 |
| Ex. 15 | | | 1 | Yes | No | No | No | No | No | Yes | No | 0.93 | 0.33 |
| Ex. 16 | | | 1 | No | No | No | No | No | No | Yes | Yes | 1.75 | 0.15 |

TABLE 2-continued

| | | Eluting | Slag Amount | Removal Method of Carbon Dioxide | | | | | | | | Precipitate | |
| | | | | Blowing Gas (Type of Gas) | | | | | | Reducing | | | Phosphorus Concentration |
| | Slag | Method | (kg/100 L) | Air | $N_2$ | $O_2$ | $H_2$ | Ar | He | Pressure | Heating | Mass (g/L) | (mass %) |
|---|---|---|---|---|---|---|---|---|---|---|---|---|---|
| Ex. 17 | | | 1 | Yes | No | No | No | No | No | Yes | Yes | 1.40 | 0.20 |
| Ex. 18 | B | | 1 | Yes | No | No | No | No | No | No | No | 0.79 | 0.67 |
| Ex. 19 | | | 1 | No | Yes | No | No | No | No | No | No | 0.86 | 0.70 |
| Ex. 20 | | | 1 | No | No | Yes | No | No | No | No | No | 0.88 | 0.61 |
| Ex. 21 | | | 1 | No | No | No | No | No | No | Yes | No | 0.31 | 1.32 |
| Ex. 22 | | | 1 | No | No | No | No | No | No | No | Yes | 1.92 | 0.41 |
| Comp. Ex. 1 | A | Water | 1 | Yes | No | No | No | No | No | No | No | 0.05 | 0.01 |

As shown in Table 2, the recovery methods of Example 1 to 22 could obtain a mixture containing a phosphorus compound and a calcium compound, in which steelmaking slag is dipped in water containing carbon dioxide, and then carbon dioxide is removed. On the other hand, the recovery method of Comparative Example 1 could hardly obtain a mixture containing a phosphorus compound and a calcium compound, in which steelmaking slag is dipped in water without carbon dioxide blown, and then carbon dioxide is removed.

Experiment 2

Experiment 2 shows examples in which each of removal of carbon dioxide and recovery of a mixture was carried out twice.

1. Preparation of Slag

The same two types of steelmaking slag as Experiment 1 (slag A and slag B) were prepared.

2. Elution of Phosphorus and Calcium

The pulverized slag (1 kg, 3 kg, or 5 kg) was loaded in 100 L of water filling each container to provide a slag suspension. Then the provided slag suspension was stirred using an impeller for 30 minutes while carbon dioxide is blown into the slag suspension at the rate of 20 L/min Each slag suspension after stirring was allowed to stand to settle out slag, and then the supernatant was recovered and filtered by filtration under reduced pressure using a filter to remove floating substances.

3. Removal of Carbon Dioxide and Recovery of Mixture (1) Blowing Gas into Aqueous Solution The supernatant loaded in a container was stirred using an impeller for 5 minutes while gas (air or $N_2$) is blown into the supernatant at the rate of 20 L/min, and subsequently the gas blowing is suspended and stirring was continued for 5 minutes. The supernatant containing a precipitate (mixture) was filtered under reduced pressure using a filter to recover the mixture. The supernatant after the recovery of the mixture was loaded in the container again, and the supernatant was stirred using the impeller for 25 minutes while gas (air or $N_2$) is blown into the supernatant at the rate of 20 L/min. The supernatant containing a precipitate (mixture) was filtered under reduced pressure using a filter to recover the mixture.

(2) Reducing Pressure of Aqueous Solution

The inside pressure of an airtight container loaded with the supernatant was kept at $1/10$ atm for 5 minutes to remove carbon dioxide, and then the supernatant containing a precipitate (mixture) was filtered under reduced pressure using a filter to recover the mixture. The inside pressure of an airtight container which was again loaded with the supernatant after the recovery of the mixture was kept at $1/10$ atm for 25 minutes to remove carbon dioxide, and the supernatant containing a precipitate (mixture) was filtered under reduced pressure using a filter to recover the mixture.

4. Measurement of Phosphorus Concentration in Mixture

The phosphorus and calcium concentrations in the mixture were measured in the same manner as in Experiment 1.

5. Results

Recovery conditions and recovery results of Experiment 2 are shown in Table 3.

TABLE 3

| | | | | Precipitate Removal Time of Carbon Dioxide | | | |
| | | | | 0 to 5 min | | 5 to 30 min | |
| | Slag | Slag Amount (kg/100 L) | Removal Method of Carbon Dioxide | Mass (g/L) | Phosphorus Concentration (mass %) | Mass (g/L) | Phosphorus Concentration (mass %) |
|---|---|---|---|---|---|---|---|
| Ex. 23 | A | 1 | Air Blowing | 0.08 | 3.17 | 0.79 | 0.01 |
| Ex. 24 | | 3 | Air Blowing | 0.13 | 5.32 | 1.7 | 0.01 |
| Ex. 25 | | 1 | $N_2$ blowing | 0.06 | 4.63 | 0.73 | 0.02 |
| Ex. 26 | | 3 | $N_2$ blowing | 0.11 | 5.11 | 1.45 | 0.01 |
| Ex. 27 | | 1 | Reducing Pressure | 0.02 | 9.82 | 0.25 | 0.02 |
| Ex. 28 | B | 1 | Air Blowing | 0.07 | 8.85 | 0.66 | 0.02 |
| Ex. 29 | | 1 | $N_2$ blowing | 0.06 | 7.99 | 0.78 | 0.02 |

As shown in Table 3, first removal of carbon dioxide for short time (5 minutes) could obtain a mixture with a high phosphorus content. Further removal of carbon dioxide from the supernatant from which most of phosphorus compound is removed could obtain a mixture with a low phosphorus content.

Experiment 3

Experiment 3 shows examples in which each of two types of methods for removing carbon dioxide mixture was carried out once to recover a mixture.

1. Preparation of Slag and Elution of Phosphorus and Calcium

The same two types of steelmaking slag as Experiments 1 and 2 (slag A and slag B) were prepared. Phosphorus and calcium were eluted in the same procedure as in Experiment 2.

2. Removal of Carbon Dioxide (1) Blowing Gas into Aqueous Solution and Heating Aqueous Solution The supernatant loaded in a container was stirred using an impeller for 5 minutes while gas (air or $N_2$) is blown into the supernatant at the rate of 20 L/min, and then the supernatant containing a mixture was filtered under reduced pressure using a filter to recover the mixture. The supernatant after the recovery of the mixture was loaded in the container again, and the supernatant was stirred using an impeller for 25 minutes while the liquid temperature of the supernatant is elevated to 90° C. to remove carbon dioxide. The supernatant was filtered under reduced pressure to recover a mixture while heating the supernatant so as not to lower the liquid temperature.

(2) Blowing Gas into Aqueous Solution and Reducing Pressure of Aqueous Solution

The supernatant loaded in a container was stirred using an impeller for 5 minutes while gas (air or $N_2$) is blown into the supernatant at the rate of 20 L/min, and the supernatant containing a mixture was filtered under reduced pressure using a filter to recover the mixture. The supernatant after the recovery of the mixture was loaded in an airtight container again, the inside pressure of the airtight container was kept at $1/10$ atm for 25 minutes to remove carbon dioxide, and then the supernatant containing a mixture was filtered under reduced pressure using a filter to recover the mixture.

3. Measurement of Phosphorus Concentration in Mixture

The phosphorus concentration in each mixture was measured in the same manner as in Experiment 1.

4. Results

Recovery conditions and recovery results of Experiment 3 are shown in Table 4.

As shown in Table 4, first removal of carbon dioxide for short time (5 minutes) could obtain a mixture with a high phosphorus content as in Experiment 2. Further removal of carbon dioxide from the supernatant from which most of phosphorus compound is removed could obtain a mixture with a low phosphorus content.

Experiment 4

Experiment 4 shows examples in which one type of method of removing carbon dioxide was carried out, and recovery of a mixture was carried out twice.

1. Preparation of Slag and Elution of Phosphorus and Calcium

Slag A used in Experiments 1 and 2 was prepared. Phosphorus and calcium were eluted in the same procedure as in Experiment 2. The weight of loaded slag was 1 kg.

2. Removal of Carbon Dioxide

Carbon dioxide was removed by stirring a supernatant loaded in an airtight container using an impeller for 5 minutes while air is blown into the supernatant at the predetermined rate, and subsequently the gas blowing is suspended and stirring was continued for 5 minutes. Subsequently, the supernatant containing a precipitate was filtered under reduced pressure using a filter to recover the precipitate. Then carbon dioxide was removed by stirring the supernatant loaded in the container again using the impeller for 25 minutes while air is blown into the supernatant at the predetermined rate, and subsequently the supernatant containing a precipitate was filtered under reduced pressure using a filter to recover the precipitate. The air blowing amount was represented as the air volume for one minute at the atmospheric pressure per 1 L of the slag suspension.

3. Measurement of Phosphorus Concentration in Mixture

The phosphorus concentration in each mixture was measured in the same manner as in Experiment 1.

4. Results

Recovery conditions and recovery results of Experiment 4 are shown in Table 5.

TABLE 4

| | | | Removal Method of Carbon Dioxide | | Precipitate | | | |
| | | | | | Gas Blowing | | Reducing Pressure or Heating | |
| | Slag | Slag Amount (kg/100 L) | Gas Blowing (0 to 5 min) | Reducing Pressure or Heating (5 to 30 min) | Mass (g/L) | Phosphorus Concentration (mass %) | Mass (g/L) | Phosphorus Concentration (mass %) |
|---|---|---|---|---|---|---|---|---|
| Ex. 30 | A | 1 | Air Blowing | Heating | 0.07 | 3.84 | 1.66 | 0.01 |
| Ex. 31 | | 3 | Air Blowing | Heating | 0.12 | 5.58 | 2.29 | 0.01 |
| Ex. 32 | | 1 | $N_2$ blowing | Reducing Pressure | 0.06 | 4.31 | 0.2 | 0.02 |
| Ex. 33 | | 3 | $N_2$ blowing | Heating | 0.13 | 5.67 | 2.99 | 0.01 |
| Ex. 34 | B | 1 | Air Blowing | Heating | 0.07 | 8.83 | 1.64 | 0.02 |

TABLE 5

| | | Precipitate Removal Time of Carbon Dioxide | | | | | |
|---|---|---|---|---|---|---|---|
| Removal Method of | | 0 to 5 min | | | 5 to 30 min | | |
| | Carbon Dioxide Air Blowing Amount (L/min) | Mass (g/L) | Precipitation Rate (g/min · L) | Phosphorus Concentration (mass %) | Mass (g/L) | Precipitation Rate (g/min · L) | Phosphorus Concentration (mass %) |
| Ex. 35 | 0.20 | 0.07 | 0.014 | 3.34 | 0.70 | 0.028 | 0.01 |
| Ex. 36 | 0.10 | 0.04 | 0.008 | 8.12 | 0.73 | 0.029 | 0.01 |
| Ex. 37 | 0.05 | 0.02 | 0.003 | 14.60 | 0.81 | 0.032 | 0.02 |

As shown in Table 5, the precipitation rate of a phosphorus compound and a calcium compound being 0.1 g/min·L or less could increase the phosphorus compound content in a mixture.

Experiment 5

Figure 3:
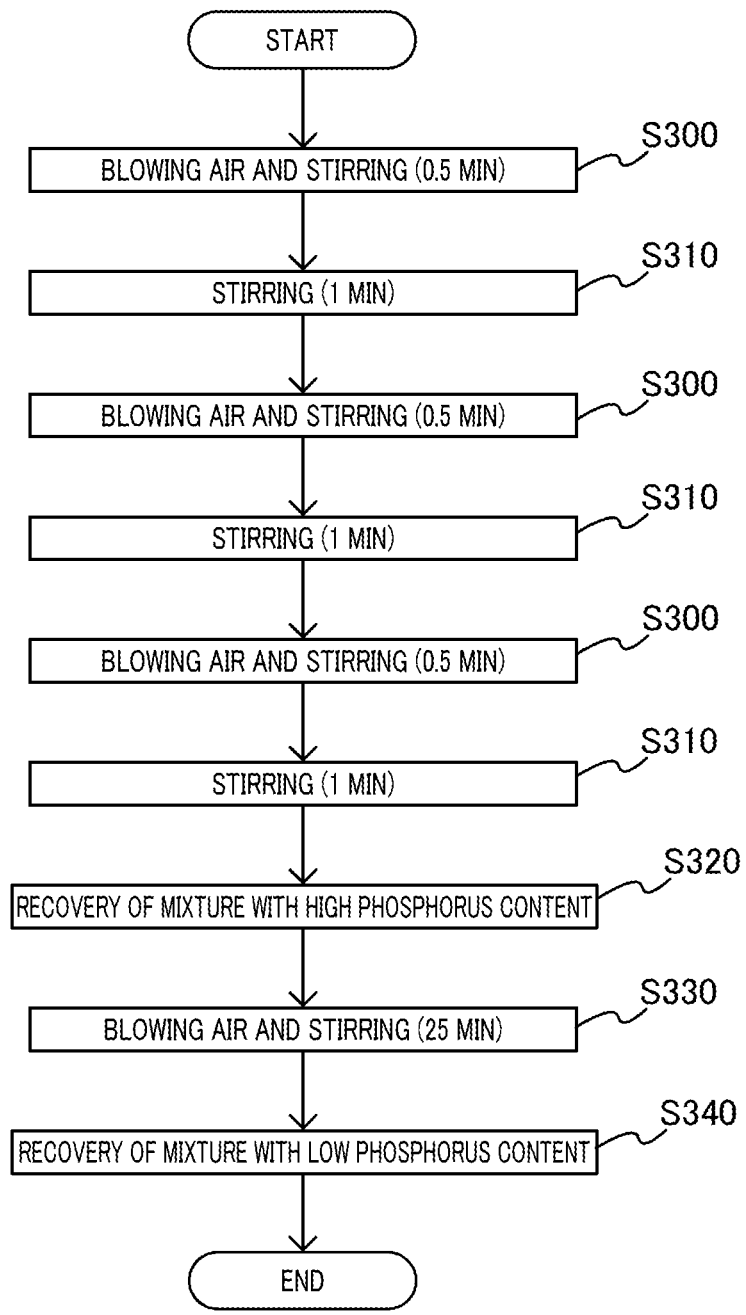
FIG. 3 is a flowchart of a method of recovering phosphorus and calcium in Experiment 5.

In Experiment 5, carbon dioxide was removed for multiple times (3 times). FIG. 3 is a flowchart of a method of recovering phosphorus and calcium in Experiment 5.

1. Preparation of Slag and Elution of Phosphorus and Calcium

Slag A used in Experiments 1 and 2 was prepared (Steps S100 and S110). Phosphorus and calcium were eluted in the same procedure as in Experiment 2 (Step S120). The weight of loaded slag was 1 kg.

2. Removal of Carbon Dioxide

Carbon dioxide was removed by stirring a supernatant loaded in a container using an impeller for 0.5 minutes while air is blown into the supernatant at the predetermined rate, and subsequently the air blowing is suspended and stirring was continued for 1 minute. The gas blowing and suspending the gas blowing are repeated for three times (Steps S300 and S310). A supernatant containing a mixture was filtered under reduced pressure using a filter to recover the mixture (Step S320). Subsequently, the supernatant loaded in a container again was stirred using an impeller for 25 minutes while air is blown into the supernatant at the rate of 20 L/min (Step S330), and then the supernatant containing a mixture was filtered under reduced pressure using a filter to recover the mixture (Step S340).

3. Measurement of Phosphorus Concentration in Mixture

The phosphorus and calcium concentrations in the mixture were measured in the same manner as in Experiment 1.

4. Results

Recovery conditions and recovery results of Experiment 5 are shown in Table 6.

TABLE 6

| | Removal of Carbon Dioxide for 3 Times | | | Air Blowing (25 min) | | |
|---|---|---|---|---|---|---|
| | Mass (g/L) | Precipitation Rate (g/min · L) | Phosphorus Concentration (mass %) | Mass (g/L) | Precipitation Rate (g/min · L) | Phosphorus Concentration (mass %) |
| Ex. 38 | 0.04 | 0.009 | 7.89 | 0.72 | 0.029 | 0.01 |

As shown in Table 6, intermittingly blowing gas (air) during the removal steps of carbon dioxide could separately obtain a mixture with a high phosphorus compound content and a mixture with a low phosphorus compound content.

As described above, the recovery method according to the present invention can recover phosphorus and calcium from steelmaking slag at low cost by eluting phosphorus and calcium contained in the steelmaking slag into an aqueous solution containing carbon dioxide, and precipitating a mixture containing a phosphorus compound and a calcium compound.

This application claims priority based on Japanese Patent Application No. 2014-013536, filed on Jan. 28, 2014, the entire contents of which including the specification and the drawings are incorporated herein by reference.

INDUSTRIAL APPLICABILITY

The method of recovering phosphorus and calcium of the present invention can recover phosphorus and calcium from steelmaking slag at low cost; therefore the method is particularly advantageous as a method of recovering phosphorus resources and calcium resources during iron making, for example.

The invention claimed is:

1. A method of recovering phosphorus and calcium from steelmaking slag, comprising:
    bringing the steelmaking slag in contact with an aqueous solution containing 30 ppm or more of carbon dioxide to elute phosphorus and calcium contained in the steelmaking slag into the aqueous solution;
    subsequently,
    partly removing the carbon dioxide from the aqueous solution to precipitate a first mixture containing a phosphorus compound in a phosphorous concentration of 3.17 to 14.60 mass % and a calcium compound; and
    subsequently, further removing the carbon dioxide from the aqueous solution to precipitate a second mixture containing a phosphorus compound in a phosphorous concentration of 0.01 to 0.02 mass % and a calcium compound.

2. The method of recovering phosphorus and calcium according to claim 1, wherein a precipitation rate of the first mixture in the partly removing of the carbon dioxide is 0.1 g/min·L or less.

3. The method of recovering phosphorus and calcium according to claim 1, wherein, in the partly removing of the carbon dioxide and the further removing of the carbon dioxide, the carbon dioxide is removed by blowing one or more gases selected from the group consisting of air, nitrogen, oxygen, hydrogen, argon and helium into the aqueous solution.

4. The method of recovering phosphorus and calcium according to claim 3, wherein, in the partly removing of the carbon dioxide, the one or more gases are intermittently blown into the aqueous solution.

5. The method of recovering phosphorus and calcium according to claim 1, wherein, in the partly removing of the carbon dioxide and the further removing of the carbon dioxide, the carbon dioxide is removed by reducing a pressure of the aqueous solution.

6. The method of recovering phosphorus and calcium according to claim 1, wherein, in the partly removing of the carbon dioxide and the further removing of the carbon dioxide, the carbon dioxide is removed by heating the aqueous solution.

\* \* \* \* \*